R. L. PATTERSON.
Seed-Dropping Attachment for Corn-Planter.
No. 210,958. Patented Dec. 17, 1878.
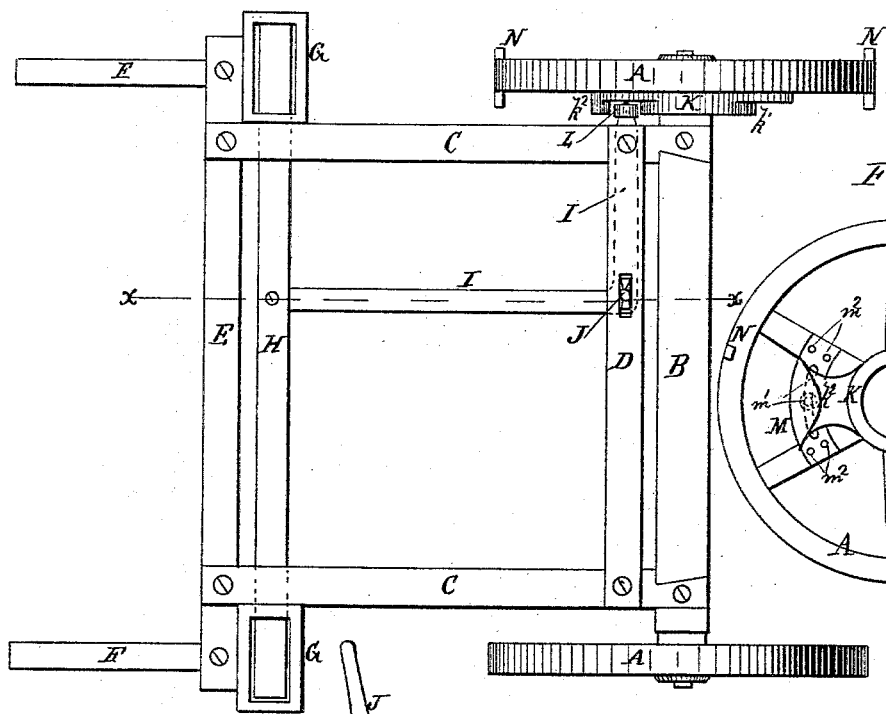
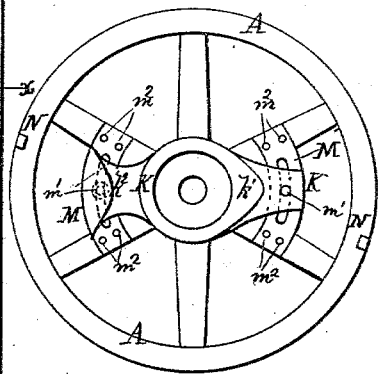
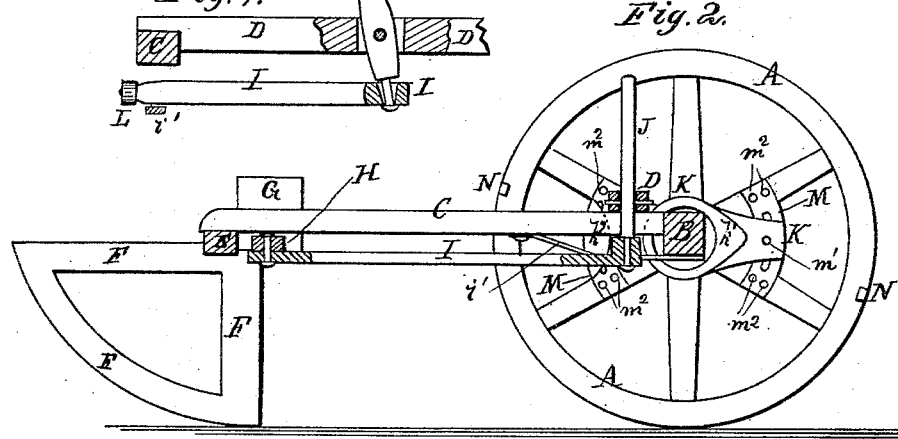
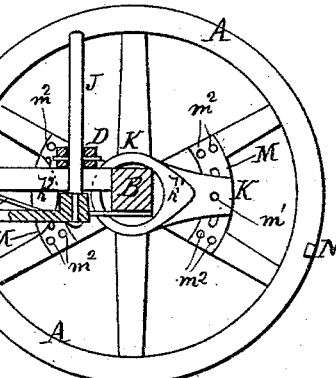
WITNESSES:
Henry N. Miller
C. Sedgwick
INVENTOR:
R. L. Patterson
BY Munn & Co
ATTORNEYS.

UNITED STATES PATENT OFFICE.

ROBERT L. PATTERSON, OF BELLE PLAINE, KANSAS.

IMPROVEMENT IN SEED-DROPPING ATTACHMENTS FOR CORN-PLANTERS.

Specification forming part of Letters Patent No. 210,958, dated December 17, 1878; application filed October 11, 1878.

*To all whom it may concern:*

Be it known that I, ROBERT LOVE PATTERSON, of Belle Plaine, in the county of Sumner and State of Kansas, have invented a new and useful Improvement in Seed-Dropping Attachments for Corn-Planters, of which the following is a specification:

Figure 1 is a top view of a part of a corn-planter to which my improvement has been applied. Fig. 2 is a vertical section of the same, taken through the line $xx$, Fig. 1. Fig. 3 is a detail view of the inner side of the driving-wheel and its attachments. Fig. 4 is a detail sectional view of a part of the attachment.

Similar letters of reference indicate corresponding parts.

The object of this invention is to furnish an improved attachment for corn-planters, which shall be so constructed that the dropping-slide will be operated by the advance of the machine to drop the seed at uniform distances apart, so that the planting may be done in accurate check-row, and which shall be simple in construction, easily thrown into and out of gear, and may be applied to any ordinary corn-planter.

The invention consists in the combination of the elbow-lever, provided with the friction-wheel, the upright lever, the cross-bar, provided with the shoulders or cams, and the curved slotted plates with the dropping-slide, the frame, and the driving-wheel.

A are the wheels, which revolve upon the journals of the axle B. To the axle B, near the inner ends of its journals, are attached the rear ends of two bars, C, to which, near their rear ends, are attached the ends of the cross-bar D. The forward ends of the two bars C are attached to the cross-bar E, the ends of which are attached to the runners F. The runners F open the furrows to receive the seed, and to their rear ends are attached the seed-hoppers G, from which the seed is removed and dropped by the dropping-slide H. To the dropping-slide H is pivoted the end of the long arm of the elbow-lever I, which is pivoted at its angle to the lower end of the lever J.

The lever J passes up through a slot in the cross-bar D, and is pivoted to the said cross-bar. The short arm of the elbow-lever I extends out into such a position that its end may be struck by the shoulders or cams $k^1$ $k^2$ of the cross-bar K. The shoulder $k^1$ is so formed as to move the end of the lever I forward, and the shoulder or cam $k^2$ is so formed as to move the said end of the said lever I rearward, so that the dropping-slide H may be moved twice to drop seed at each revolution of the driving-wheel A.

The short arm of the lever I is kept in position to be operated by the shoulders of the cross-bar K by the keeper $i'$ attached to the side bar, C, and to the axle B, as shown in Fig. 2.

To the end of the short arm of the lever I is pivoted a small wheel or roller, L, to diminish the friction between the said end and the shoulders $k^1$ $k^2$ of the cross-bar K. The cross-bar K has a hole formed through its center for the axle B and the hub of the wheel A to pass through, so that the said cross-bar can come close to the spokes of the said wheel A.

The ends of the cross-bar K are secured to the curved plates M by bolts $m^1$, which pass through the ends of the said cross-bar K and through curved slots in the curved plate M, so that the said cross-bar K may be adjusted as required. The ends of the curved plates M are secured to the spokes of the wheel A by hook-bolts or other bolts $m^2$. To the rim of the wheel A are attached cross-heads or blocks N, to mark the ground exactly over each hill, to serve as a guide to the driver, so that he can plant the field in accurate check-row.

With this construction, by operating the lever J the driver can easily throw the lever I into and out of gear with the cross-bar K, so that the machine can be turned around at the side of the field and can be drawn from place to place without operating the seed-dropping slide.

In using the machine, when the side of the field has been reached the lever I is thrown out of gear with the cross-bar K, and the machine is turned around and drawn forward until the seed-hoppers G are exactly in line with a cross-row. The lever I is then thrown into gear with the cross-bar K, and the driving-wheel A is turned by hand until the dropping-slide H is operated to drop the seed. The machine is then drawn forward, and the seed will be dropped in line with the cross-rows previously planted, so that the hills will be in accurate check-rows.

Having thus described my invention, I claim as new and desire to secure by Letters Patent—

The combination of the elbow-lever I, provided with the friction-wheel L, the upright lever J, the cross-bar K, provided with the shoulders or cams $k^1 k^2$, and the curved slotted plates M, with the dropping-slide H, the frame C D, and the wheel A, substantially as herein shown and described.

ROBERT LOVE PATTERSON.

Witnesses:
C. E. DURNBAUGH,
J. W. FORNEY.